2,714,276

MINERAL WOOL IMPREGNATED WITH A CONDENSATION PRODUCT OF EPICHLOROHYDRIN AND A FATTY AMINE AND PROCESS OF PREPARING SAME

Chester G. Landes, New Canaan, Conn., assignor to American Cyanamid Company, New York, N. Y., a corporation of Maine No Drawing. Application December 29, 1950, Serial No. 203,539

6 Claims. (Cl. 49—77.5)

This invention relates to the treatment of mineral wool and more particularly, to a process for imparting water resistance to mineral wool.

Rock wool is an insulating material composed of a fluffy mass of fine interlacing fibers of rock glass manufactured from rock of suitable composition. The term "mineral wool" includes rock wool, slag wool and glass wool and is a general term designating insulating materials in the form of fine glassy fibers. Slag wool is manufactured from the slags produced in the smelting of metallic ores.

In manufacture of rock wool, for example, slag, rock, or the like which generally consists of four principal constituents, i. e., silica, alumina, lime and magnesium, is melted in a cupola furnace. The molten material is drawn into a stream and passed in front of a jet of compressed air or combined air and steam whereupon the melt is dispersed into a cone of liquid globules. There are generally several streams of molten material blown simultaneously, the number depending upon the size of the equipment. The globules are drawn out by air resistance into long fibers which collect in a chamber. A small portion of the molten material cools and solidifies before being transformed into fibers, and the small globular beads so formed are known as shot.

The aim of rock wool manufacturers is the production of a mass of interlacing long, thin fibers with a low proportion of shot. For the production of long fibers the chemical composition of the melt before blowing must be such that a considerable range of viscosity exists between the states of fluidity and solidification. Melts of high lime content tend to produce a soft, short-fibered wool, whereas if the silica content is too high a harsh wool is produced.

The diameter of the fibers and the proportion of shot are affected by the conditions under which the wool is blown. The more viscous the melt at the instant of blowing, the coarser are the fibers and the greater the formation of shot. Increased pressure of the air or steam blast decreases the proportion of shot formed. Wet steam adversely affects the properties of the wool giving a heavy product.

Various materials have been incorporated with mineral wool during and after its manufacture in order to modify its properties. These materials are generally applied by atomization from above the fan-shaped stream of defibered slag but they may be applied to the finished wool, if desired. For example, paraffin oil has been applied to prevent dusting and flying of the wool; water-soluble phenolic resins have been applied to impart stiffness, increase bulking and otherwise improve the texture of the wool; and waxes, metallic soaps and the like, have been applied to increase the water resistance of the wool.

In order to obtain any appreciable water-proofing effect by treating mineral wool with wax, a fairly large quantity of the wax size has had to be used, so much that the wool becomes soggy and loses its resilience. This is, of course, a great disadvantage since the insulating properties of mineral wools depend upon their ability to remain fluffy and dispersed throughout the area provided for insulation instead of packing into a portion of that area.

It is an object of the present invention to increase the water resistance of mineral wool without disadvantageously affecting its other properites.

Another object of the present invention is to provide a product which will impart water repellancy to mineral wool.

A further object of the present invention is the production of light, fluffy resilient mineral wool.

Still another object of the present invention is the production of loose rock wool, rock wool batts, etc., which are resistant to water.

The above and other objects are attained by treating mineral wool with a resin which is a water-soluble condensation product of a fatty amine and epichlorohydrin.

The invention will be described in greater detail in conjunction with the following specific examples which are merely illustrative and not intended to limit the scope of the invention.

EXAMPLE 1

An 0.01% solution in hot boiling water of the reaction product of 1 mol of octadecylamine with 1.8 mols of epichlorohydrin, prepared as described below, is prepared. The solution is cooled and used to impregnate dry untreated rock wool and glass wool so that 0.01% of the resin, based on the dry weight of the wool, is retained. The so-impregnated wool is dried for one hour at 260° F. in an oven.

The resistance of the treated rock wool and glass wool to water is determined by subjecting samples of the wools to float tests. The procedure is simple. Containers containing water at about 20°–25° C. are provided and the wool samples dropped onto the surfaces of the water. The time taken for the sample to sink is used as a measure of its water resistance. The following results are obtained:

| Treatment | Float Test | |
|---|---|---|
| | Rock Wool | Glass Wool |
| None | 10 seconds | 10 seconds. |
| 0.01% resin | indefinite [1] | indefinite.[1] |

[1] The wool was not wetted even by the time all the water in the container had evaporated.

EXAMPLE 2

A 1% solution in water of the resin used in Example 1 and described in greater detail below is prepared and sprayed onto hot rock wool in the blow chamber of a rock wool manufacturing mill. For purposes of comparison a portion of the wool is similarly treated with a wax size, and another portion given no treatment at all. The water resistance of the rock wools so prepared is set forth in the following table:

| Treatment (amounts based on dry rock wool) | Float Test |
|---|---|
| None | 10 seconds. |
| 0.3% emulsion containing 95% wax and 5% rosin | more than 3 hours.[1] |
| 0.005% resin | Do. |
| 0.01% resin | Do. |

[1] No sign of sinking after 3 hours.

It will be apparent from the results of the foregoing example that in order to obtain water resistance equal to that provided by the amine-epichlorohydrin condensation product it is necessary to use a much larger quantity of wax. Rock wool containing as much as 0.3% wax is soggy and does not have the desired degree of fluffiness or resiliency.

Preparation of octadecylamine-epichlorohydrin condensation product

A quantity of octadecylamine is heated to 75° C., and 1.8 mols of epichlorohydrin per mol of amine are added over a period of 1½ hours. The reaction mixture is then heated for about 1½ hours, the temperature at all times being maintained between 70° and 80° C.

The product obtained contains some glycerol dichlorohydrin by-product which may be removed if desired. This removal is not necessary, however, and the crude product may be used directly.

Resins which are suitable for increasing the water resistance of mineral wool in accordance with the process of the present invention may be prepared in general by condensing epichlorohydrin with a fatty amine containing 16 or more carbon atoms. I prefer, primarily for the sake of economy and efficiency, those fatty amines which have 16 or 18 carbon atoms and no more than 50% unsaturation. From 1.2 to 2.5 mols of epichlorohydrin may be reacted with each mol of amine in accordance with the general procedure set forth in U. S. Patents Nos. 2,089,569 and 2,174,762 and more specifically, in accordance with the procedure set forth above.

While my process is not limited to the use of any particular quantity of resin, it particularly contemplates the treatment of mineral wool with 0.005% to 0.05%, based on the dry weight of the wool, of amine-epichlorohydrin condensation product, and I prefer using about 0.01% resin. If the amount is increased beyond about 0.05%, not only may the wool tend to become soggy and lose its resilience, but the water resistance of the resin may, surprisingly enough, drop off.

As will be seen from the examples, the resin may be applied to the finished mineral wool product or it may be introduced into the blown stream of molten mineral. In either case it is necessary that the resin product be heated, generally at temperatures of from about 220° F. to about 300° F., for however long is necessary to cure or polymerize the resin to a water-insoluble condition.

It is an advantage of the present invention that the cost of mineral wool treatment according to my process is very low since only very small quantities of amine-epichlorohydrin condensation product are required.

A further advantage of the present invention resides in the greater ease with which the new mineral wool treating products may be shipped and handled. Wax-emulsions, for instance, are subject to freezing.

I claim:

1. A process for preparing water-resistant mineral wool which comprises impregnating mineral wool with from 0.005% to 0.05% by weight based on the dry weight of the mineral wool of a water-soluble condensation product of epichlorohydrin and a fatty amine containing from 16 to 18 carbon atoms and having no more than 50% unsaturation, the epichlorohydrin being present in an amount of from 1.2 to 2.5 mols per mol of said fatty amine, and heating the impregnated wool to water insolubilize the condensation product.

2. Water-resistant mineral wool impregnated with from 0.005% to 0.05% by weight based on the dry weight of the mineral wool of a heat insolubilized condensation product of epichlorohydrin and a fatty amine containing from 16 to 18 carbon atoms and having no more than 50% unsaturation, the epichlorohydrin being present in an amount of from 1.2 to 2.5 mols per mol of fatty amine.

3. Water-resistant rock wool as defined in claim 2.

4. Water-resistant glass wool as defined in claim 2.

5. A process for preparing water-resistant mineral wool which comprises impregnating mineral wool with from 0.005% to 0.05% by weight based on the dry weight of the mineral wool of a water-soluble condensation product of epichlorohydrin and a fatty amine containing from 16 to 18 carbon atoms and having no more than 50% unsaturation, the epichlorohydrin being present in an amount of from 1.2 to 2.5 moles per mole of said fatty amine, and insolubilizing the condensation product by heat.

6. A process for preparing water-resistant mineral wool which comprises blowing molten mineral slag into mineral wool fibers and impregnating the blown wool fibers while still suspended and in a heated condition with from 0.005% to 0.05% by weight based on the dry weight of the mineral wool fibers of a water-soluble condensation product of epichlorohydrin and a fatty amine containing from 16 to 18 carbon atoms and having no more than 50% unsaturation whereby the water-soluble condensation product is insolubilized by the heat of the fibers, the epichlorohydrin being present in an amount of from 1.2 to 2.5 moles per mole of said fatty amine.

References Cited in the file of this patent

UNITED STATES PATENTS

| | | |
|---|---|---|
| 1,977,253 | Stallmann | Oct. 16, 1934 |
| 2,083,132 | Williams et al. | June 8, 1937 |
| 2,107,284 | Bone et al. | Feb. 8, 1938 |
| 2,136,928 | Schlack | Nov. 15, 1938 |
| 2,174,762 | Schuette et al. | Oct. 3, 1939 |
| 2,189,840 | Simison | Feb. 13, 1940 |
| 2,356,542 | Sloan | Aug. 22, 1944 |
| 2,468,086 | Latham et al. | Apr. 26, 1949 |
| 2,479,480 | Dudley | Aug. 16, 1949 |
| 2,569,920 | Buck | Oct. 2, 1951 |

OTHER REFERENCES

Silver et al.: Modern Plastics, November 1950, vol. 38, Issue 3, pages 113, 114, 116, 118, 120, 122.